(12) United States Patent
Hernandez (10) Patent No.: US 10,173,782 B2
(45) Date of Patent: Jan. 8, 2019

(54) TOGGLE LINK LATCH

(71) Applicant: QRP, Inc., Leland, NC (US)

(72) Inventor: Andres Hernandez, Yorba Linda, CA (US)

(73) Assignee: QRP, Inc., Leland, NC (US)

( * ) Notice: Subject to any disclaimer, the term of this patent is extended or adjusted under 35 U.S.C. 154(b) by 528 days.

(21) Appl. No.: 14/733,412

(22) Filed: Jun. 8, 2015

(65) Prior Publication Data

US 2016/0264250 A1    Sep. 15, 2016

Related U.S. Application Data

(63) Continuation-in-part of application No. 14/657,373, filed on Mar. 13, 2015.

(51) Int. Cl.
*B64D 29/06* (2006.01)
*E05C 19/14* (2006.01)

(52) U.S. Cl.
CPC ............ *B64D 29/06* (2013.01); *E05C 19/145* (2013.01); *Y10T 292/0946* (2015.04)

(58) Field of Classification Search
CPC ....... B64D 29/06; B64D 29/08; E05C 19/145; E05C 19/14; E05C 19/10; E05C 1/065;

(Continued)

(56) References Cited

U.S. PATENT DOCUMENTS 2,714,032 A * 7/1955 Mills .......................... B60J 9/02
  292/113
2,904,141 A * 9/1959 Henrichs ............... E05C 19/145
  292/108

(Continued)

FOREIGN PATENT DOCUMENTS

EP        0206648      12/1986
WO    WO 2009/009732    1/2009

OTHER PUBLICATIONS

International Search Report and Written Opinion of the International Searching Authority. PCT/US17/51980 dated Dec. 1, 2017.

(Continued)

*Primary Examiner* — Mark A Williams
(74) *Attorney, Agent, or Firm* — Ryder, Lu, Mazzeo & Konieczny LLC; Joseph M. Konieczy, Sr.; Gregory J. Gore (57) ABSTRACT

A latch with a unique nesting toggle linkage that extends and retracts a hook via movement of an actuation handle. The linkage links have U-shaped lateral cross sections with a central channel into which the respective links nest when the latch is closed to minimize the overall volume of the latch. The links fold toward each other while closing to reduce the latch's overall length when fully closed. The components of the latch are arranged so that the center of gravity of the latch is positioned in front of a mounting pin; therefore, in applications where the latch swings in the vertical plane, the hook will necessarily hang downwardly away from the keeper when the latch is open. Optionally, a keeper detector prevents the actuation handle from closing if the keeper has not been first captured in the mouth of the hook. A rod-and-cylinder slide mechanism may be employed between the hook body and the mounting pin.

23 Claims, 6 Drawing Sheets

(58) Field of Classification Search
CPC ......... Y10T 292/0917; Y10T 292/0871; Y10T 292/089; Y10T 292/54; Y10S 292/31; Y10S 292/49
USPC .......................................................... 292/97
See application file for complete search history.

(56) References Cited

U.S. PATENT DOCUMENTS

| | | | | |
|---|---|---|---|---|
| 2,927,812 | A * | 3/1960 | Smith | E05C 3/122 |
| | | | | 292/196 |
| 3,259,412 | A | 7/1966 | Wheeler | |
| 4,053,177 | A * | 10/1977 | Stammreich | E05C 19/145 |
| | | | | 292/113 |
| 4,602,812 | A * | 7/1986 | Bourne | E05C 19/145 |
| | | | | 292/113 |
| 4,743,052 | A | 5/1988 | Stammreich et al. | |
| 5,620,212 | A * | 4/1997 | Bourne | B64D 29/06 |
| | | | | 292/113 |
| 5,915,765 | A * | 6/1999 | Sternberger | B64D 29/06 |
| | | | | 24/270 |
| 5,984,382 | A | 11/1999 | Bourne | |
| 6,036,238 | A | 3/2000 | Lallament | |
| 6,279,971 | B1 | 8/2001 | Dessenberger | |
| 6,325,428 | B1 | 12/2001 | Do | |
| 6,343,815 | B1 * | 2/2002 | Poe | E05C 19/145 |
| | | | | 292/113 |
| 8,864,185 | B2 * | 10/2014 | Do | B64C 1/1446 |
| | | | | 292/105 |
| 8,925,979 | B2 * | 1/2015 | Hernandez | E05L 363/143 |
| | | | | 292/113 |
| 9,677,306 | B2 * | 6/2017 | DeFrance | E05C 19/10 |
| 2008/0129056 | A1 | 6/2008 | Hernandez et al. | |
| 2010/0026482 | A1 | 2/2010 | Grichener | |

OTHER PUBLICATIONS

EPO, European Search Report, dated Nov. 18, 2015, Publisher: European Patent Office, Published in: European Patent Office.

* cited by examiner

TOGGLE LINK LATCH

CROSS-REFERENCE TO RELATED APPLICATION

This application is a continuation-in-part of U.S. patent application Ser. No. 14/657,373 entitled "Toggle Link Latch" filed on Mar. 13, 2015, priority from which is hereby claimed.

FIELD OF THE INVENTION

The present invention relates to a cinch latch, which connects a first structural element to a keeper on a second structural element. More specifically, the invention relates to aircraft panel latches having a hook at one end and an over-center locking linkage at the other.

BACKGROUND OF THE INVENTION

A wide variety of latching mechanisms for use in aircraft exist in the prior art because aircraft have many components, such as fuselage panels including cowlings and the like, which must be opened and closed very securely. For example, tension latches mounted on one panel cinch to a keeper on a second panel to hold one of the movable panels closed. Other latches include sliding toggle linkages to minimize the kinematic envelope of the latch. These linkages rotate around a mounting pin to produce the latch reach. The complexity of quality aircraft latches makes them relatively large and heavy. Since every component of an aircraft should be as light as possible, it would be desirable to provide a quality latch having a reduced size and weight compared to the prior art.

To reduce weight, aircraft panels are relatively thin, which translates to an associated reduction in sturdiness. As a result, the aircraft panels and other structures to which the above-described latches are attached are delicate and can be easily damaged. For example, with some prior art latches, the free end of an open latch may obstruct the opening defined by the movable panel. Therefore, when closing the movable panel, it can strike the latch and be damaged if the latch is not properly retracted. This problem is often encountered with open overhead panels where gravity biases the latch assembly in the closed direction, thereby orienting the hook in an extended position pointing upwardly. This configuration occurs if the center of gravity of the latch is "behind" (in the direction away from the hook) the pivot point of the panel mounting pin. If this occurs, the hook end of the latch could be jammed against the edge of the mating substructure if the latch isn't first pulled away before attempting to close the panel. This weight distribution problem is often solved by adding unnecessary or "dead" weight to the hook end of the latch so that it hangs downward and away from the load plane. However, this solution contradicts a salient aircraft design consideration of weight reduction. Therefore, it would be desirable to provide a quality latch that reduces the risk of accidental damage to the surrounding aircraft structures to which it is attached.

SUMMARY OF THE INVENTION

The invention comprises a latch mechanism with an arrangement of components that places the center of gravity of the mechanism in front of the mounting pin. Therefore, in applications where the latch swings in the vertical plane, the hook will necessarily hang downward away from the keeper when the latch is opened without the need for adding dead weight. This functionality has been achieved in part by locating the mounting pin slot at the very end of the latch arm and arranging the toggle linkage so that the linkage-to-hook pivot joint is on the body of the latch arm in front of the mounting pin. In one embodiment of the invention, the alignment function of the hook body employs a rod and cylinder slide mechanism in place of the hook body slot.

The latch includes a unique nesting toggle linkage that minimizes overall latch volume. Each link of the linkage has a U-shaped lateral cross section with a central channel that receives the other link when the latch is closed. Furthermore, the links fold toward each other instead of away from each other while closing, which reduces the latch's overall length when fully closed. The latch may include a keeper detector, which prevents the actuation handle from closing if the keeper is not captured by the hook. The keeper detector helps prevent unsuccessful latching and provides a visual indication when a panel is closed but the keeper is not engaged.

Before explaining at least one embodiment of the invention in detail, it is to be understood that the invention is not limited in its application or to the details of construction in the following description or illustrated in the drawings. The invention encompasses numerous other embodiments and can be carried out in various ways.

BRIEF DESCRIPTION OF THE DRAWINGS

FIG. 6a is a bottom left rear perspective view of an alternative embodiment of the invention which employs a rod-and-cylinder slide mechanism; and, FIG. 6b is a left side elevation of the embodiment shown in FIG. 6a.

DESCRIPTION OF THE PREFERRED EMBODIMENT(S)

Figure 1:
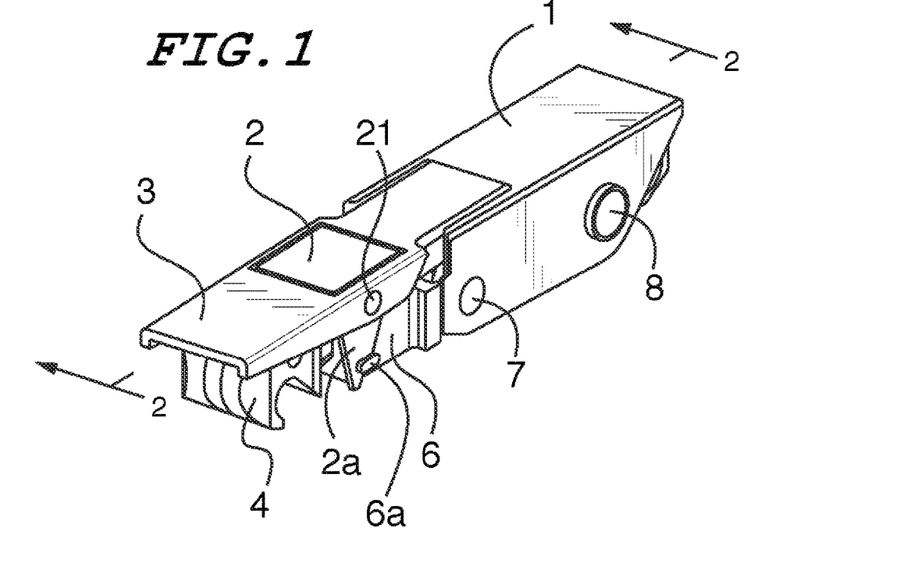
FIG. 1 is a top right front perspective view of one embodiment of the invention.
Figure 2:
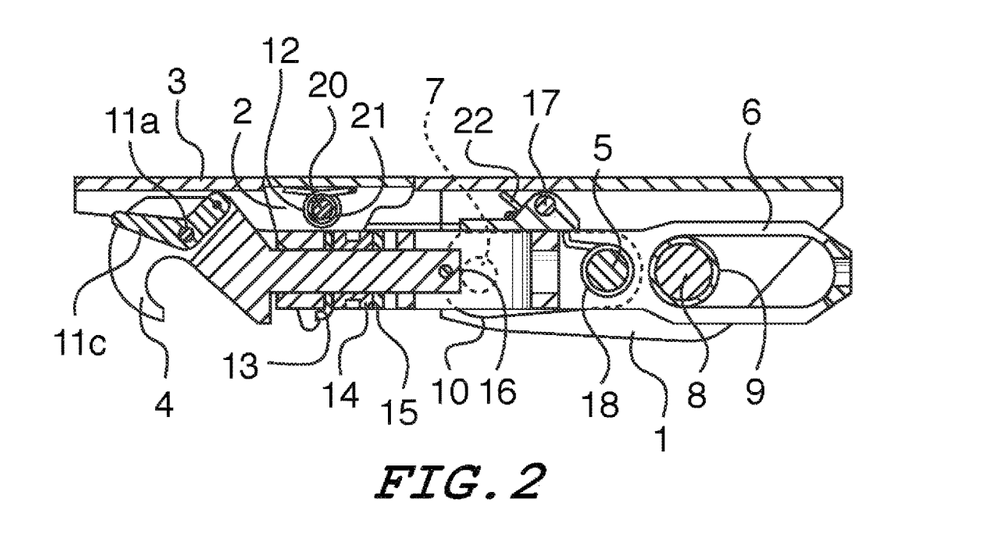
FIG. 2 is a cross-sectional view of the embodiment shown in FIG. 1.

A latch in accordance with one preferred embodiment of the invention is illustrated and described with respect to FIGS. 1-4. Referring first to FIGS. 1 and 2, the latch has a substantially-symmetrical construction about a longitudinal axis so features shown on one side apply equally to the opposite side. The latch generally includes an upper link 1, lower link 10, a handle 3, a hook 6, and additional linkage components that operably connect the handle 3 to the hook 4. As described in greater detail below, movement of the handle 3 extends and retracts the hook 4 between open and closed positions.

The upper link 1 is constructed of thin sheet metal and has side walls that surround other internal components of the latch to minimize the latch's overall volume and weight. The upper link 1 operably pivots about a mounting pin 8 that connects the latch to an associated fixed structure such as a portion of an aircraft (not shown). Rivets 7 straddle the front walls of the upper link and hingedly connect it to the front of a lower link 10, which nests inside a central channel of the upper link 1. The lower link 10 is also pivotally connected to an elongate latch arm 6 by a pin 5. The rear walls of the latch arm 6 include a pair of slots 6b in which the mounting pin 8 can translate. Each link includes a center channel between opposing thin sidewalls forming a U-shaped lateral cross section. When assembled, the body of the latch arm 6 nests within the lower link 10, which in turn nests within the upper link 1. This nested configuration provides a very compact device as better appreciated when viewing FIG. 3. This combination of elements forms the latch toggle linkage.

A handle 3 is rotatably connected to the lower link 10 and the upper link 1 by a pin 17, which carries a spring 22 that biases the handle upward away from the lower link 10 toward the open position of the latch. The location of the pin 17 permits a small amount of free travel of the handle. Likewise, another spring 18 biases the lower link upward away from the latch arm 6 to hold the latch open. The handle 3 actuates the latch between open and closed positions. After a limited amount of free movement restricted by the back end of the handle abutting the lower link 10, continued lifting of the handle 3 will lift the lower link upward, extending the hook and releasing the latch as best seen in FIGS. 5d and 5e.

Figure 6A:
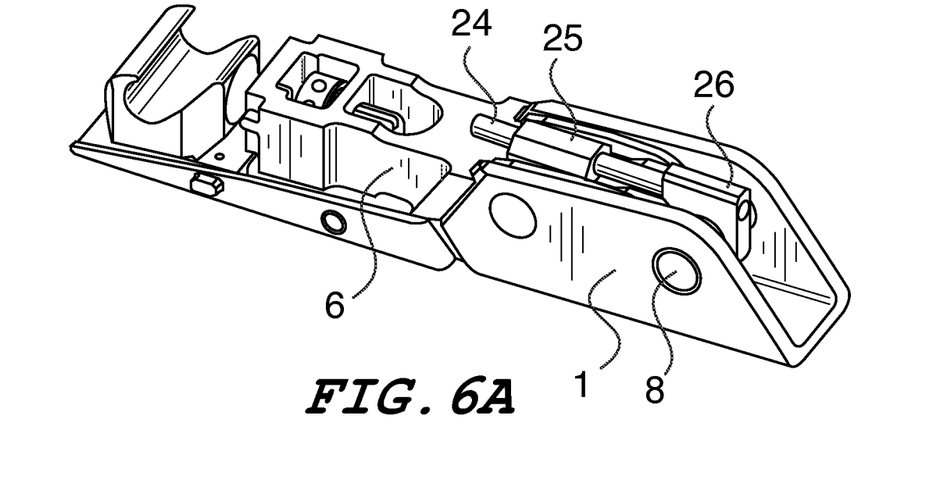
Figure 6B:
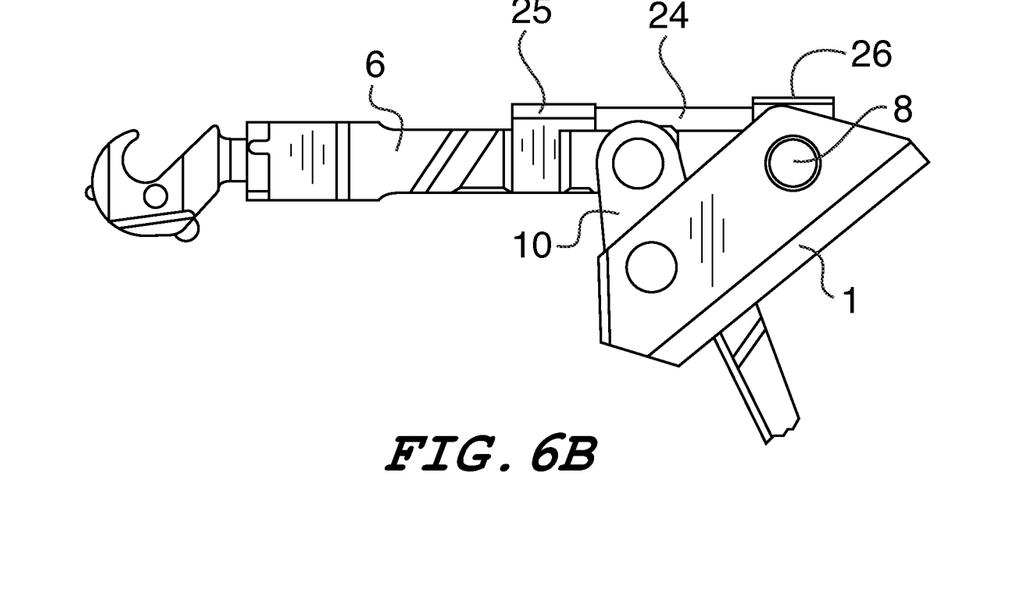

Referring now to FIGS. 6a and 6b an alternate embodiment of the invention is depicted. Here the hook body slot slide mechanism shown in the previous Figures which provides hook alignment is replaced by a rod-and-cylinder slide mechanism. In FIG. 6a this embodiment is shown in the latch closed position. Affixed to hook body 6 is a slide cylinder 25 which closely receives rod 24. The rod is rigidly affixed to a holding block 26 that is rotationally secured to mounting pin 8. In FIG. 6b we see the latch in the open position with cylinder 25 extended about the rod 24. It will be appreciated by these relations that the rod-and-cylinder slide mechanism provides the hook body with lateral stability which maintains its alignment within links 1 and 10.

As described above, the handle extends and retracts a latch arm 6 having hook 4 at the front end. The hook 4 engages and grabs a keeper (not shown) in the closed position and applies a tensile clinch load between the keeper and the latch mounting pin 8.

Figure 4:
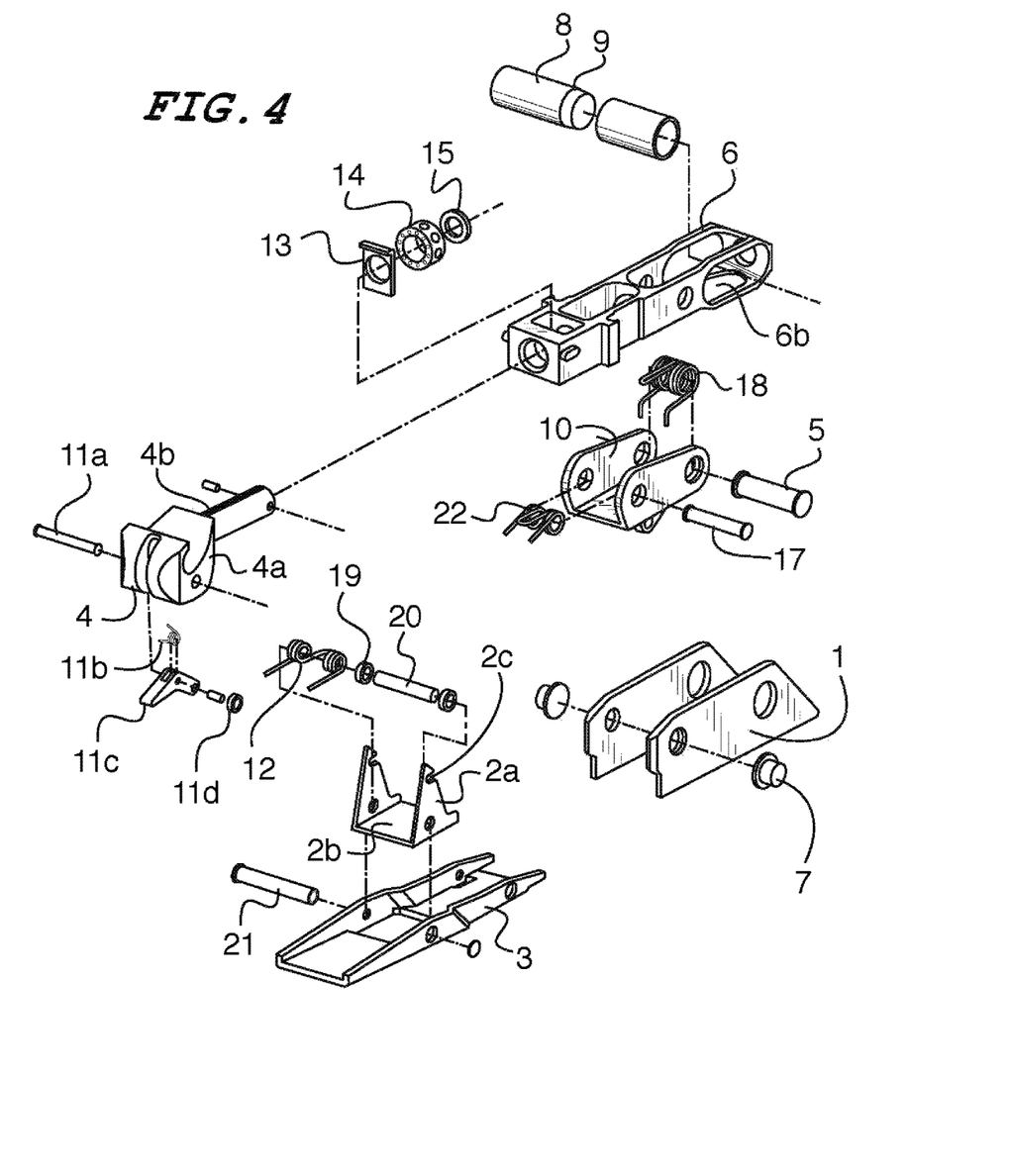
FIG. 4 is an exploded assembly view of the embodiment show in FIG. 1.

The handle 3 includes a trigger 2 that releasably locks the handle 3 in a closed position. The trigger 2 is pivotally attached to the handle 3 by a pin 20, which includes a concentric sleeve 21 about which the handle can pivot to a limited extent. The trigger 2 releasably holds the handle 3 down in the configuration shown in FIGS. 1 and 5a when the latch is locked. As best seen in FIG. 4, the trigger 2 has a generally-planar base 2b and two side arms 2a fixed at their proximal ends to and extending transversely from opposed sides of the base 2b. The distal end of each arm 2a includes a transverse slot 2c, which creases a barbed end. The slots 2c are shaped and located to engage a catch 6a on opposed sides of the latch arm 6. In this embodiment, the catches 6a comprise a small protuberance that extends from the side walls of the latch arm 6. The trigger 2 is spring loaded and the side arms 2a include barbed ends, which bear against the catches 6a as the handle 3 is closed. This action ensures that the slots 2c capture the catches 6a to provide a self-actuating effect when the handle 3 is pushed fully closed.

An exploded view of the latch arm 6, and the other latch components, is shown in FIG. 4 from a bottom perspective. The latch arm 6 is arranged in fixed connection to a hook 4 at the front end and in translating connection to the mounting pin at the rear end. The mounting pin 8 is surrounded by a bushing 9 received through a pair of longitudinally-extending slots 6b in the side walls of the latch arm 6. The hook assembly 4 consists of hook-shaped head 4a and a cylindrical mount 4b, which is constructed to cooperatively engage and connect to a yoke in the front of the latch arm 6. A nut 14, nut plate 13, spring 15 and stop pin 16 connect the hook 4 to the yoke.

The trigger 2 is connected to the handle 3 by a pin 20. Another spring 12 biases the trigger 2 upwardly so that its top surface is flush with the top of the handle 3 when the latch is closed and locked as shown in FIG. 1. Each side arm 2a of the trigger 2 has a slot which engages the locking catch 6a protruding from the sides of the latch arm 6 as seen in FIG. 1 and as described above.

The various components discussed above are shown assembled and in the locked position viewed from the side and the top in FIG. 2. In a preferred embodiment, the hook 4 includes means for detecting whether or not the hook is engaged with the keeper. In one embodiment, the detecting means 11 is fixed to the head 4a as best seen in FIG. 4. The detecting means includes a sensor lever 11c having one arm that is biased downward into the mouth of the hook 4. When the keeper (not shown) properly occupies the hook 4, a first lever arm is pushed upwardly against the bias of a spring 11b into the position shown in this FIG. 2. Otherwise, when the mouth of the hook 4 is unoccupied, the first lever arm will point downwardly and a second lever arm will then point upwardly and make contact with the handle 3 to stop the handle 3 from fully closing. Thus, the detecting means prevents the latch 3 from closing if the hook is not properly engaged with the keeper.

Figure 3:
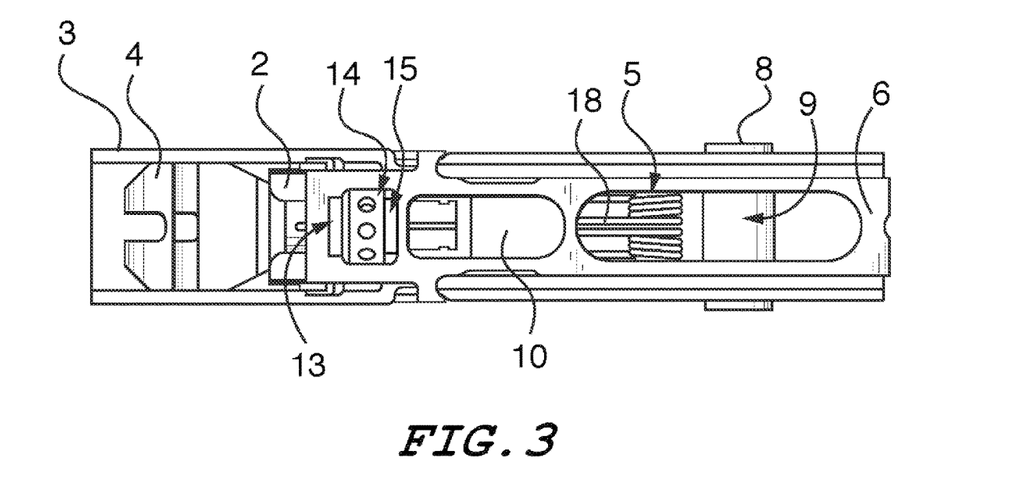
FIG. 3 is a bottom plan view of the embodiment shown in FIG. 1.

The compact design of the latch is best illustrated in FIG. 3. The major components, including the upper link 1, the lower link 10, the latch arm 6, and the handle 3 all nest with one another more or less when the latch is closed. As shown in FIG. 4, the upper link 1 has U-shaped central channel with sidewalls that surrounds the lower link 10 and part of the handle 3. The lower link 10 likewise has a channel that surrounds a portion of the latch arm 6. In addition, the upper link 1 surrounds a portion of the handle 3. As depicted in FIG. 3, the relatively thin sidewalls of the links provide a minimal lateral dimension of the latch. The length of the latch is also minimized by the toggle linkage because the toggle links fold together rather than spread apart as leverage is applied to the hook when it is being closed. This feature is illustrated in reverse order in the opening sequence of FIGS. 5a through 5e. The construction of the toggle linkage provides an over-center alignment of the link joints so that a portion of the applied load is transmitted through the linkage to forcibly hold the latch in a stable closed condition.

FIGS. 5a through 5e depict a sequence of configurations of the latch as it transitions from fully closed to fully open. A top perspective view of the latch is shown on the left of each Figure. On the right of each Figure, the latch is shown in the same configuration as on the left but in an upside-down, side-elevational view, which is a typical in an aircraft application where the latch swings in the vertical plane. Operation of the keeper detecting means 11 is not shown since the associated mating keeper is not depicted here.

Figure 5A:
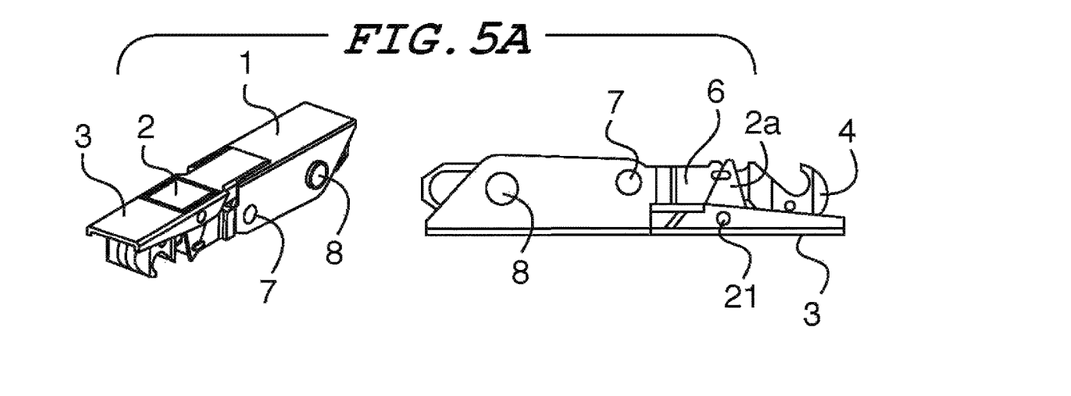
FIGS. 5a through 5e depict a series of paired corresponding perspective and elevational views of another embodiment of the invention in various operational configurations.
Figure 5B:
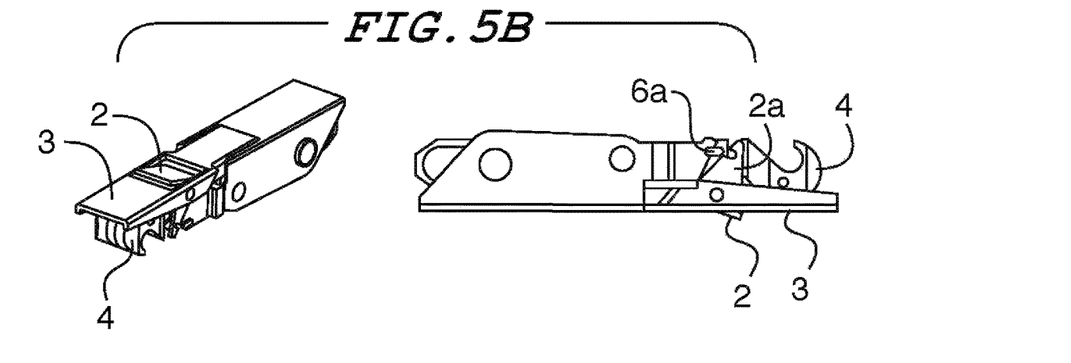

In FIG. 5a, the latch is shown properly closed and secured. A portion of the load applied between the hook and the mounting pin 8 holds the latch closed by virtue of an over-center alignment of the linkage joints. In FIG. 5b, the latch is shown immediately after the trigger 2 has been depressed to release the handle from the locked position. Initial depression of the trigger rotates the side arms 2a out of engagement with the catches 6a on latch arm 6.

Figure 5C:
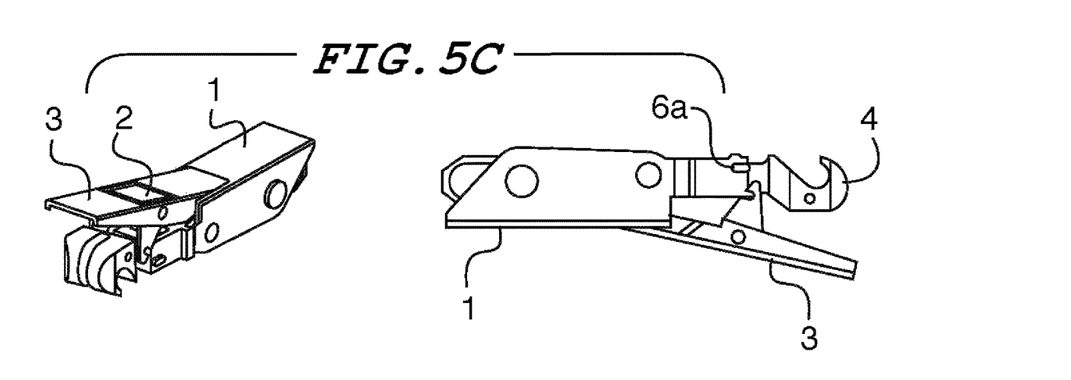
Figure 5D:
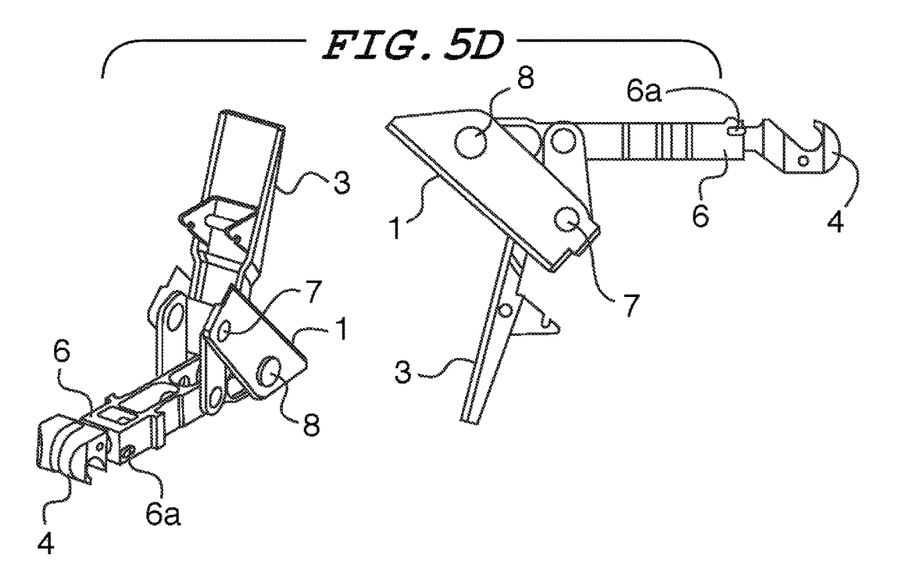
Figure 5E:
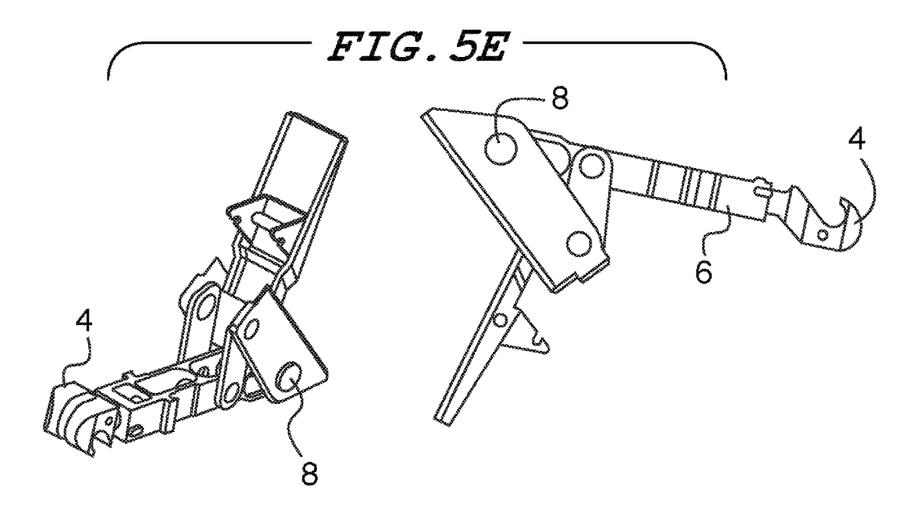

In FIG. 5c, the latch is shown after gravity and the spring has urged the handle 3 outward to the extent of its free travel on the lower link. At this location, a back end of the handle contacts the top of the lower link. In this configuration with the handle popped outward, the handle can be easily grasped to open the latch.

In FIG. 5d, the latch is shown after the handle has been pulled open, which extends the hook to its maximum reach or take-up position. FIG. 5d illustrates the nesting of the links 1 and 10 together with the handle 3 as well as disengagement of the side arm 2a from the catches 6a.

FIG. 5e depicts the maximum reach position of the hook 4, which corresponds to a release position of the hook 4 from a keeper. A spring biases the lower link away from the hook 4 to hold the latch fully opened. With the keeper released, the latch arm rotates about the mounting pin 8, which allows the hook 4 to hang down away from the keeper (to the extent allowed by surrounding structures) because the center of gravity of the latch is in front of the mounting pin 8.

Another preferred embodiment of the invention is shown in FIGS. 6A and 6B. In this embodiment, the hook body slot slide mechanism shown in the previous Figures, which provides hook alignment, is replaced by a rod-and-cylinder slide mechanism. The latch of this embodiment is shown in the closed position in FIG. 6A. A slide cylinder 25 is affixed to the hook body 6. The slide cylinder closely receives a rod 24. The rod 24 is rigidly affixed to a holding block 26 that is rotationally secured to a mounting pin 8. The latch is shown in an open position in FIG. 6B. In the open position, the cylinder 25 is extended about the rod 24. It will be appreciated by these relations that the rod-and-cylinder slide mechanism provides the hook body with lateral stability, which maintains its alignment within links 1 and 10.

With the operational explanation of FIGS. 5a-e and 6a-b taken together with the explanation of FIGS. 1 through 4, a full understanding of the invention will have been appreciated by one of skill in the mechanical arts. It will be readily apparent that objects of the invention have been achieved by providing a light-weight latch with an extremely small kinematic envelope while allowing adequate reach and closing leverage. Furthermore, the objective of providing a lever latch which is protective of surrounding structures has also been achieved.

The foregoing description is considered as illustrative only of the principles of the invention. Further, since numerous modifications and changes will readily occur to those skilled in the art, it is not desired to limit the invention to the exact construction and operation shown and described, and accordingly all suitable modifications and equivalents should be considered encompassed within the scope of the invention.

The invention claimed is:

1. A latch for applying a clinch load between a mounting pin and a keeper, comprising:
    an elongate latch arm having first and second opposite ends and rotatably and slideably affixed to an upper toggle link by a mounting pin affixed to the latch arm at the first end of the latch arm, and having a hook at the second end of the latch arm opposite the first end adapted for engaging the keeper to apply a clinch load between the keeper and the mounting pin;
    a lower link hingedly connected to the latch arm at one end of the lower link and hingedly connected to the upper toggle link at an opposite end of the lower link, said upper toggle link and lower link providing a toggle linkage for extending and retracting the latch arm between an open position wherein the clinch load is released and a stable closed position provided by an over-center alignment of the toggle linkage when in the closed position whereby the clinch load is applied through the latch arm by actuation of the lower link by rotation of a handle affixed to the lower link which moves the toggle linkage between the open and the closed positions;
    wherein the toggle linkage and the latch arm are configured such that they lie nested one within the other when the latch is in the closed position, said lower link lying within a first channel in the upper link and a portion of said latch arm lying within a second channel in the lower link.

2. The latch of claim 1, wherein the handle is moveable between locked and unlocked positions within a limited range of rotational motion with respect to the lower link.

3. The latch of claim 2 further including a lock assembly including a trigger pivotably connected to the handle which releasably holds the handle in the locked position.

4. The latch of claim 3 wherein said trigger comprises a base and a pair of side arms fixed to and extending from opposed sides of said base, and said lock assembly includes a pair of catches extending from the latch arm that releasably engage said side arms to hold the handle in the locked position, wherein the base of said trigger lies substantially flush with the handle when the handle is held in the locked position.

5. The latch of claim 4 wherein the handle includes bias means that urge the handle toward the unlocked position.

6. The latch of claim 5 wherein said handle is substantially flush with the upper link when the handle is in the locked position.

7. The latch of claim 1 wherein the joints of the links form an over-center position of the toggle linkage when the latch is closed whereby a portion of the load applied between the mounting pin and the latch arm forces the linkage toward the closed position.

8. The latch of claim 7 wherein the trigger includes bias means that resiliently urge the trigger toward the locked position.

9. The latch of claim 1 wherein the upper and lower links each have a U-shaped lateral cross section.

10. The latch of claim 9 wherein the lower link includes bias means that urge the lower link in a direction away from said hook.

11. The latch of claim 1 wherein the latch arm includes a keeper detector mechanism which prevents the handle from closing if the mouth of the hook is not occupied by the keeper.

12. The latch of claim 11 wherein the keeper detector mechanism includes a rotatable lever having two arms, a first arm that contacts the handle and prevents it from closing when a second arm of the lever occupies the mouth of the hook indicating the absence of the keeper.

13. The latch of claim 12 wherein the keeper detector mechanism includes spring that forces the second lever arm into the mouth of the hook when it is not occupied.

14. The latch of claim 1 wherein the toggle linkage has toggle links that fold together as the handle moves toward the locked position.

15. The latch of claim 14 wherein said mounting pin is constructed and arranged to connect the latch to a supporting structure.

16. The latch of claim 15 wherein the latch is connected to a supporting structure.

17. The latch of claim 16 wherein the supporting structure is a part of an aircraft.

18. The latch of claim 2 wherein a portion of the handle is nested within said first channel of the upper link.

19. The latch of claim 4 wherein said side arms have barbed ends that bear against said catches as the handle is moved to the locked position.

20. The latch of claim 1 further including a longitudinally extending slot in the hook body which receives the mounting pin.

21. The latch of claim 1 further including a rod-and-cylinder slide mechanism comprising a cylinder affixed to the latch arm and a rod slideably received within the cylinder, said rod rotatably affixed to the mounting pin such that said slide mechanism provides lateral alignment of the latch arm with other elements of the latch as the latch is opened and closed.

22. A latch for applying a clamp load between a mounting pin and a keeper, comprising:
   a rotatable latch handle operative to actuate the latch between open and closed positions of the latch which correspond to open and closed positions of the handle respectively whereby a clamp load between the mounting pin can be selectively applied or released;
   an over-center toggle linkage affixed to the handle;
   a latch arm affixed to said toggle linkage and having a hook at one end having a mouth adapted to receive the keeper and mounting pin attachment means an opposite end, said latch handle, said toggle linkage, and said latch arm being operative such that a portion of the clamp load applied between the mounting pin and the keeper by rotation of the handle forces the linkage toward the closed position when the latch and handle are in the closed position; and
   a mechanism for preventing the handle from closing fully when the mouth of the hook is not occupied comprising a lever rotatably affixed to the hook, said lever being spring-biased to a position where one end of the lever lies within the mouth of the hook when it is not occupied while a second end of the lever blocks the handle from fully rotating to the closed position by direct contact with the handle.

23. A latch for applying a clamp load between a mounting pin and a keeper, comprising:
   a rotatable latch handle operative to actuate the latch between open and closed positions which correspond to open and closed positions of the handle respectively whereby a clamp load between the mounting pin can be selectively applied or released by rotating the handle;
   an over-center toggle linkage affixed to the handle;
   a latch arm affixed to said toggle linkage and having a hook at one end with a mouth adapted to receive the keeper and mounting pin attachment means an opposite end, said latch handle, said toggle linkage, and said latch arm being operative such that a portion of the clamp load applied between the mounting pin and the keeper by rotation of the handle forces the linkage toward the closed position when the latch and handle are in the closed position; and
   a rod-and-cylinder slide mechanism comprising a cylinder affixed to the latch arm and a rod slideably received within the cylinder, said rod rotatably affixed to the mounting pin such that said slide mechanism provides lateral alignment of the latch arm with other elements of the latch as the latch is opened and closed.

\* \* \* \* \*